(12) United States Patent
Irie et al.

(10) Patent No.: US 6,301,406 B1
(45) Date of Patent: Oct. 9, 2001

(54) OPTICAL FIBER WITH LENS

(75) Inventors: Yuichiro Irie; Toshio Kimura, both of Ichihara; Takeo Shimizu, Fujisawa, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/214,202

(22) PCT Filed: Apr. 16, 1998

(86) PCT No.: PCT/JP98/01730

§ 371 Date: Dec. 30, 1998

§ 102(e) Date: Dec. 30, 1998

(87) PCT Pub. No.: WO98/50808

PCT Pub. Date: Nov. 12, 1998

(30) Foreign Application Priority Data

May 7, 1997 (JP) .................................................... 9-116812

(51) Int. Cl.⁷ .................................................... G02B 6/32
(52) U.S. Cl. .................................................... 385/33
(58) Field of Search .................................. 385/33, 79, 61, 385/88

(56) References Cited

U.S. PATENT DOCUMENTS

| 5,256,851 | 10/1993 | Presby . | |
|---|---|---|---|
| 5,416,881 | 5/1995 | Ikeda . | |
| 5,446,816 | * | 8/1995 | Shiraishi et al. ........................ 385/33 |
| 5,455,879 | 10/1995 | Modavis et al. . | |
| 5,566,262 | * | 10/1996 | Yamane et al. ......................... 385/33 |
| 5,845,024 | * | 12/1998 | Tsushima et al. ...................... 385/33 |
| 5,967,653 | * | 10/1999 | Miller et al. .......................... 362/580 |

FOREIGN PATENT DOCUMENTS

| 55-153384 | 11/1980 | (JP) . |
|---|---|---|
| 61-256310 | 11/1986 | (JP) . |
| 4-91302 | 3/1992 | (JP) . |
| 6-67061 | 3/1994 | (JP) . |

* cited by examiner

Primary Examiner—Frank G. Font
Assistant Examiner—Layla Lauchman
(74) Attorney, Agent, or Firm—Frishauf, Holtz, Goodman, Langer & Chick, P.C.

(57) ABSTRACT

There is provided a lensed optical fiber (20) in which a lens is formed on the end face of an optical fiber to enhance the efficiency of optical coupling with a light beam. The tip end portion of an optical fiber (21) is formed with a lens (26) formed into a wedge shape having two slant portions (24) symmetrical with respect to an axis (Ac) of a core (22) and a plane portion (25) perpendicular to the axis of the core.

2 Claims, 3 Drawing Sheets

(PRIOR ART)

OPTICAL FIBER WITH LENS

TECHNICAL FIELD

The present invention relates to a lensed optical fiber in which a lens is formed on the end face of an optical fiber to enhance the efficiency of optical coupling with a light beam.

BACKGROUND ART

In order to enhance the efficiency of optical coupling of a light beam from a light source such as a laser diode device with an optical fiber, there has been used a lensed optical fiber in which a lens is formed on the end face of an optical fiber. For example, as shown in FIG. 4, a lens 2 formed on the end face of an optical fiber 1 has an external form consisting of a hyperboloidal portion 2a and a spherical portion 2b inscribed in the hyperboloidal portion 2a. The optical fiber 1 having the lens 2 of this form has a high efficiency of optical coupling with a light source. For a laser diode having a generating wavelength of 0.98 $\mu$m at the center, the maximum optical coupling efficiency can be obtained when a radius R of the spherical portion 2b inscribed in the hyperboloidal portion 2a is generally 1.5 to 5 $\mu$m (see U.S. Pat. No. 5,256,851).

As shown in FIG. 5, there also has been proposed an optical fiber having a lens 12 of a wedge-shaped external form having two-stage tapered portions 12a and 12b with different angles of θ1 and θ2, respectively (see U.S. Pat. No. 5,455,879). An optical fiber 11 having a lens 12 of the form shown in FIG. 5 also exhibits a high optical coupling efficiency.

However, the aforementioned lensed optical fibers have the following problems:

1) For the lens 2 of the first form shown in FIG. 4, the hyperboloidal portion 2a is formed by being polished using a flat plate polishing machine while the angle between the optical fiber and the polishing machine is adjusted. Therefore, for the lens 2 of the first form, it is difficult to fabricate the hyperboloidal portion 2a with high reproducibility, so that the yield decreases. Also, the optical coupling efficiency varies in a sensitive manner depending on the diameter of the spherical portion 2b, which also results in a decrease in yield.

For the lens 2 of the first form, morever, it is difficult to accurately determine the boundary between the hyperboloidal portion 2a and the spherical portion 2b when the radius of the spherical portion 2b inscribed in the hyperboloidal portion 2a is measured. Therefore, the lens 2 of this form presents a problem in that inspection of the external form takes much time.

2) The lens 12 of the second form shown in FIG. 5 is polished while the angle between the optical fiber 11 and the polishing machine is kept constant. Therefore, the lens 12 of the second form can be fabricated more easily than the lens 2 of the first form. However, for the lens 12 of the second form, because two-stage tapered portions 12a and 12b with different angles of θ1 and θ2 are formed, the fabrication takes much time, and the reproducibility of form and increase in yield are limited.

Accordingly, an object of the present invention is to provide a lensed optical fiber which overcomes the aforementioned drawbacks of the conventional lensed optical fibers and, more specifically, to provide a lensed optical fiber which has a high efficiency of optical coupling with a light source, and which can be fabricated with high fabrication accuracy and high yield.

DISCLOSURE OF THE INVENTION

The present invention has been made based on discoveries made as a result of earnest theoretical study of the conventional lensed optical fibers. The present invention provides a lensed optical fiber in which a lens is formed at the tip end of an optical fiber having a core and a cladding, characterized in that the lens is formed into a wedge shape having two slant portions symmetrical with respect to an axis of the core and a plane portion perpendicular to the axis of the core.

The lensed optical fiber having the tip end portion of the aforementioned shape has a high optical coupling efficiency. Also, since the shape of this tip end portion is simply formed by three planes, the lensed optical fiber can easily be fabricated with high accuracy and high yield. Also, inspection of the external form can be made easily.

Preferably, an angle between the slant portion and the plane portion is set at 110 to 170°, and the distance between two intersecting lines on which the slant portion and the plane portion intersect with each other is set at 1 to 4 $\mu$m. Thereby, the lensed optical fiber in accordance with the present invention achieves has an efficiency of 40% or higher of optical coupling with a light source.

BEST MODE OF CARRYING OUT THE INVENTION

An embodiment of the present invention will be described in detail with reference to the accompanying drawings.

Figure 1A:
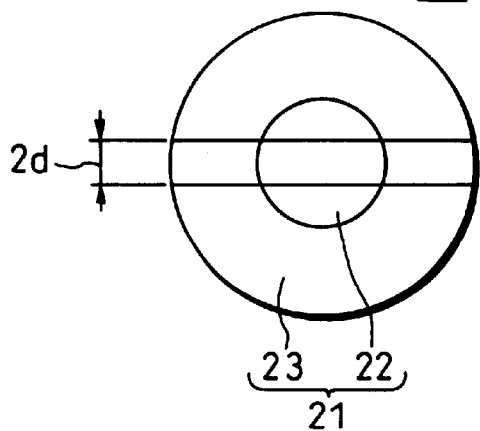
FIG. 1A is a front view of a tip end portion of one embodiment of a lensed optical fiber in accordance with the present invention.
Figure 1B:
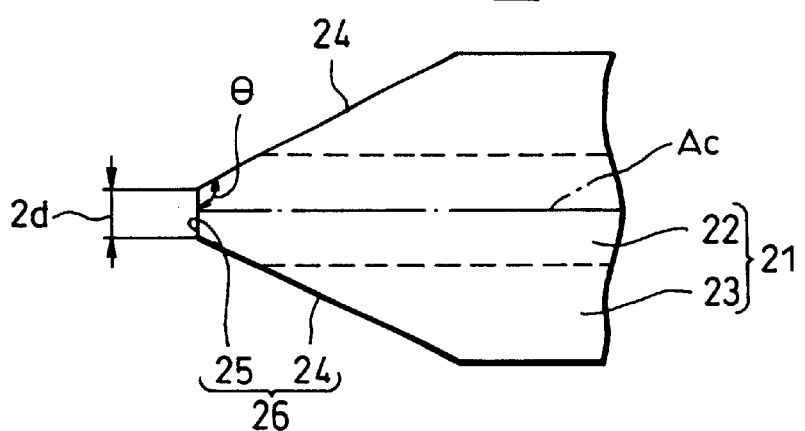
FIG. 1B is a side view of a tip end portion of the lensed optical fiber shown in FIG. 1A.

FIG. 1A and FIG. 1B are a front view and a side view, respectively, of a tip end portion of one embodiment of a lensed optical fiber 20 in accordance with the present invention. In the figures, an optical fiber 21 has a core 22 with a circular cross-sectional shape and a cladding 23. The tip end portion of the optical fiber 21 is formed with a lens 26 comprising of a wedge-shaped portion formed by two slant portions 24 which are symmetrical with respect to a core axis Ac and a plane portion 25 which is perpendicular to the core axis Ac. An angle which the slant portion 24 make with the plane portion 25 is taken as θ, and a distance between the two points at which the slant portions 24 and the plane portion 25 intersect with each other is taken as 2d.

The aforementioned lensed optical fiber 20 was manufactured by a fabrication procedure as described below.

First, the tip end of the optical fiber 21 was cleaved to form the plane portion 25 which is perpendicular to the core axis Ac.

Next, the optical fiber 21 was polished while an angle between a flat plate polishing machine and the core axis Ac was kept at a desired angle (θ–90°) using a jig. By this polishing process, the tip end of the optical fiber 21 could be formed into wedge-shaped lens 26.

As described above, the lensed optical fiber 20 of this embodiment can be manufactured by cleaving the tip end of the optical fiber to form the plane portion 25 and by polishing the slant portions 24 at the tip end of the optical fiber 21 by onetime angle control. For the lensed optical fiber 20, therefore, the fabrication process is very simple, the yield is increased easily, and the fabrication cost is decreased.

Figure 2:
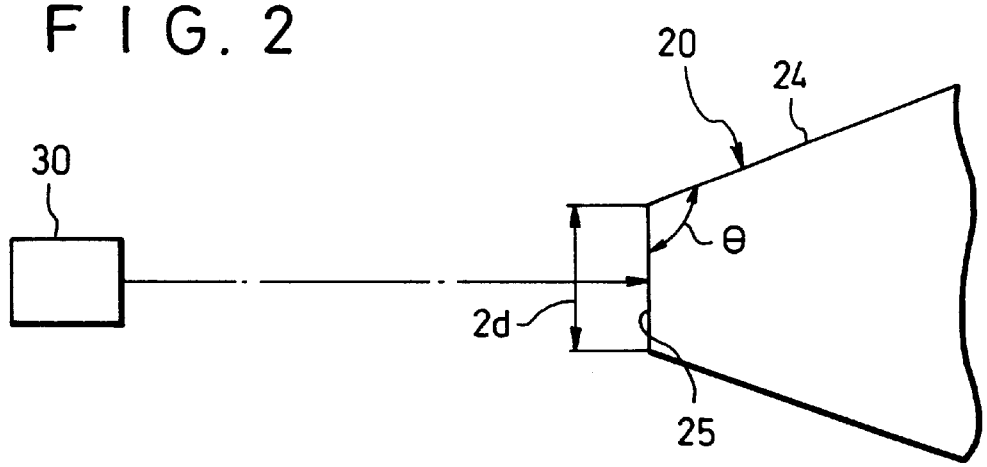
FIG. 2 is a view for illustrating the measurement of optical coupling efficiency of the above embodiment.

For the lensed optical fiber 20, the optical coupling efficiency was evaluated under the conditions shown in FIG. 2.

A laser diode, for example, having a generating wavelength of 0.98 μm at the center was used as a light source 30, and the intensity distribution (mode field) pattern of emitted light from the light source 30 was made an ellipse having a major axis of 4.8 μm and a minor axis length of 1.2 μm. Also, the mode field pattern of the optical fiber 21 constituting the lensed optical fiber 20 was made a circle having a diameter of 6.0 μm. Here, the distance between the light source 30 and the lensed optical fiber 20 was made the optimum distance at which the highest optical coupling efficiency can be obtained, for example, 10 μm, and the minor axis direction of the mode field pattern of the light source 30 was made a direction perpendicular to the direction of a line connecting the two points at which the slant portions 24 and the plane portion 25 intersect with each other.

Under the above conditions, the efficiency of optical coupling with the light source 30 was evaluated by changing the angle θ between the slant portion 24 and the plane portion 25 with the distance between the two points at which the slant portions 24 and the plane portion 25 intersect with each other being used as a parameter.

Figure 3:
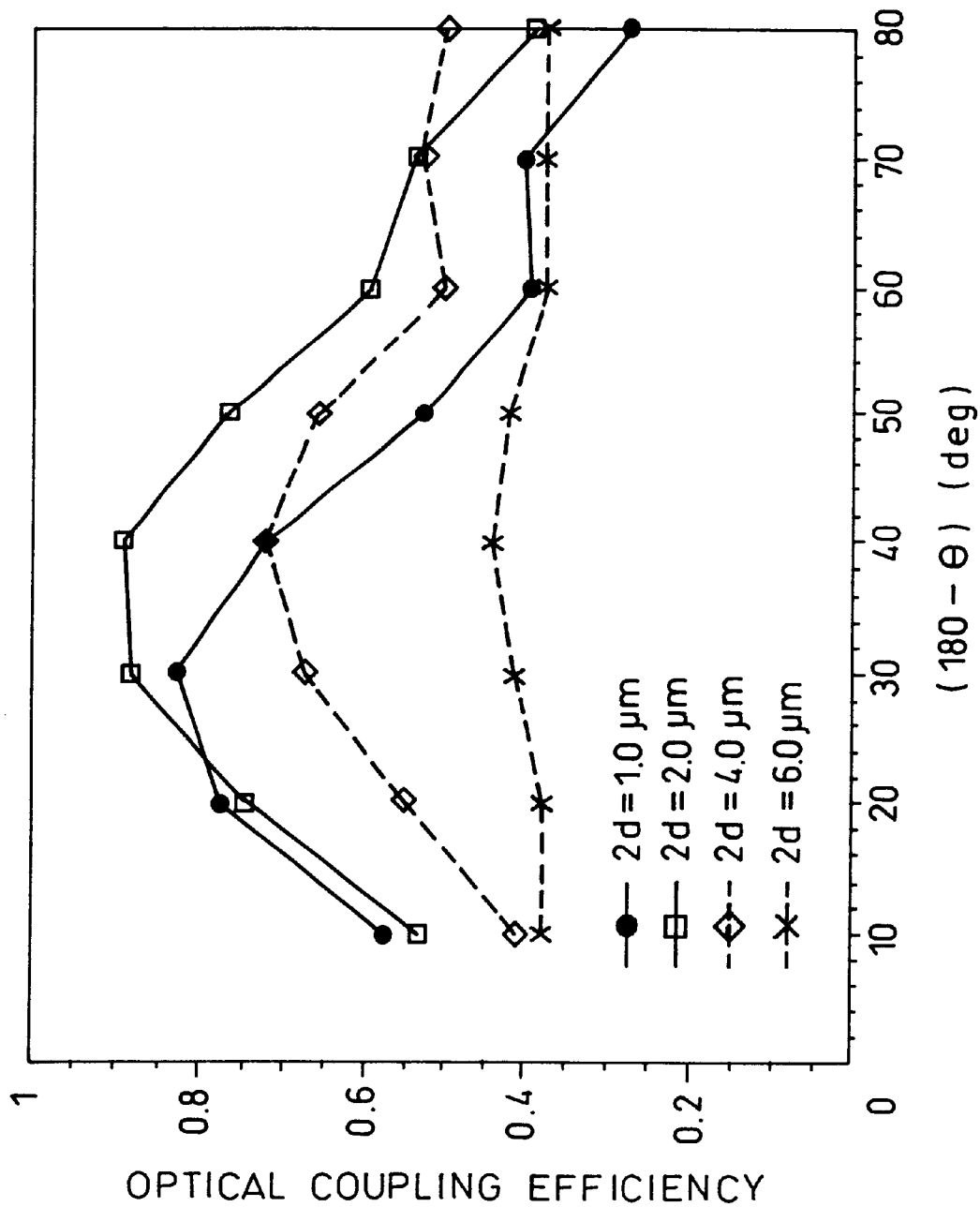
FIG. 3 is a characteristic diagram showing the relationship between an angle θ which a slant portion makes with a plane portion and the optical coupling efficiency for the above embodiment.

The results are shown In FIG. 3, in which the abscissa represents (180−θ) and the ordinate represents the coupling efficiency.

Here, the optical coupling efficiency was obtained from P2/P1, where P1 is the whole power of light emitted from the light source 30, and P2 is the power of light incident on the optical fiber.

As seen from FIG. 3, in the range of 1.0 to 4.0 μm of the distance 2d and 110 to 170° of the angle θ (in the figure, (180−θ)=10 to 70°), an efficiency of 40% or higher of optical coupling with the light source 30 was obtained. In particular, in the case where 2d=2.0 μm and θ=140 to 150° ((180−θ)= 30 to 40°), an optical coupling efficiency as high as 90% was obtained.

Figure 4:
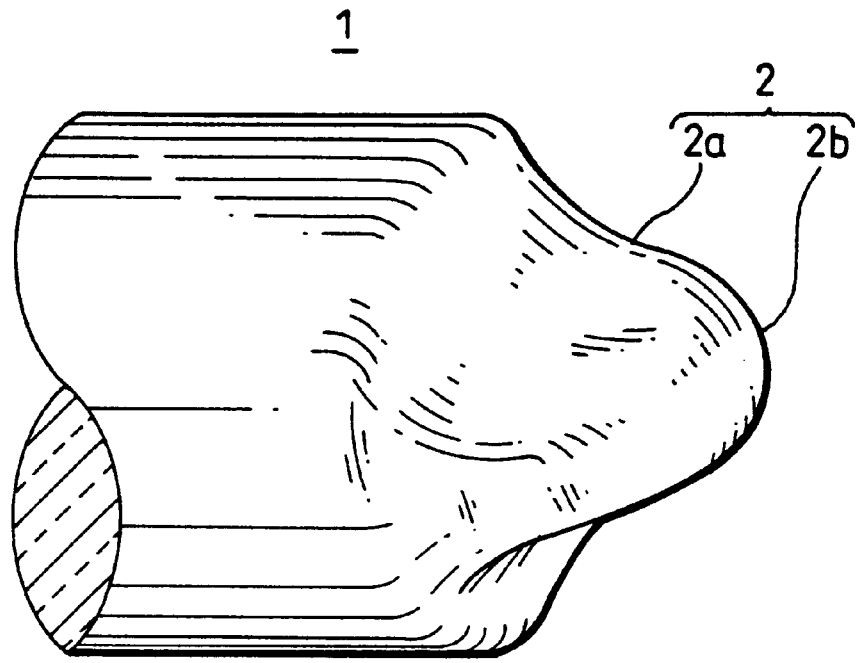
FIG. 4 is a perspective view of a conventional lensed optical fiber.
Figure 5:
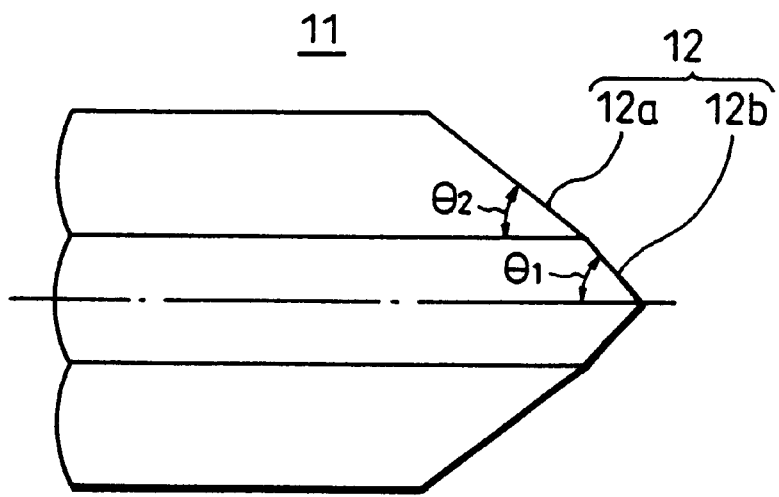
FIG. 5 is a schematic view of another conventional lensed optical fiber.

As a comparative example, the optical coupling efficiency of a lensed optical fiber whose tip end portion was not of a planar shape perpendicular to the core axis Ac but instead which had a lens 2 as shown in FIG. 4, was measured under the aforementioned conditions. In this case, an optical coupling efficiency of 97% at a maximum was obtained.

Thus, the lensed optical fiber of the present invention exhibits a high optical coupling efficiency which is by no means inferior to the comparative example. Considering the high workability of the present invention, an excellent lensed optical fiber which can be mass-produced at a low cost can be provided.

INDUSTRIAL APPLICABILITY

The present invention provides a lensed optical fiber which has a high optical coupling efficiency and which can be fabricated with high accuracy and high yield.

What is claimed is:

1. A lensed optical fiber comprising:

an optical fiber having a core and a cladding, and a wedge shaped lens formed at a tip end of the optical fiber, wherein said wedge shaped lens comprises two slant portions that are symmetrical with respect to an axis of said core, and a plane portion that intersects with said slant portions and that is perpendicular to the axis of said core.

2. A lensed optical fiber according to claim 1, wherein an angle between each said slant portion and said plane portion is in a range of 110 to 170°, and a distance between two points at which said slant portions and said plane portion intersect with each other is 1 to 4 μm.

* * * * *